(12) United States Patent
Yoshizu

(10) Patent No.: US 12,228,185 B2
(45) Date of Patent: Feb. 18, 2025

(54) DISK BRAKE

(71) Applicant: Hitachi Astemo, Ltd., Hitachinaka (JP)

(72) Inventor: Rikiya Yoshizu, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 545 days.

(21) Appl. No.: 17/439,991

(22) PCT Filed: Mar. 18, 2020

(86) PCT No.: PCT/JP2020/011941
§ 371 (c)(1),
(2) Date: Sep. 16, 2021

(87) PCT Pub. No.: WO2020/217788
PCT Pub. Date: Oct. 29, 2020

(65) Prior Publication Data
US 2022/0307562 A1    Sep. 29, 2022

(30) Foreign Application Priority Data

Apr. 22, 2019  (JP) ................................. 2019-081126

(51) Int. Cl.
*F16D 65/18*         (2006.01)
*B60T 13/74*         (2006.01)
(Continued)

(52) U.S. Cl.
CPC ............ *F16D 65/18* (2013.01); *B60T 13/746* (2013.01); *F16D 2121/24* (2013.01); *F16D 2127/06* (2013.01)

(58) Field of Classification Search
CPC ...... F16D 65/18; F16D 65/46; F16D 2121/24; F16D 2127/06; B60T 13/746
See application file for complete search history.

(56) References Cited

U.S. PATENT DOCUMENTS 4,014,414 A * 3/1977 Yamamoto ............ F16D 65/567
                                                    192/85.37
4,651,852 A * 3/1987 Wickham .............. B60T 8/1893
                                                    188/173
(Continued)

FOREIGN PATENT DOCUMENTS

JP       2005-331022       12/2005
JP       2006-70962        3/2006
(Continued)

OTHER PUBLICATIONS

International Search Report issued Jun. 16, 2020 in corresponding International Application No. PCT/JP2020/011941, with English translation.
(Continued)

*Primary Examiner* — Bradley T King
*Assistant Examiner* — James K Hsiao
(74) *Attorney, Agent, or Firm* — Wenderoth, Lind & Ponack, L.L.P.

(57) ABSTRACT

The present disk brake includes a braking force holding mechanism configured to restrict a rotation of a rotational shaft (a ratchet gear) to hold a braking force based on driving of a solenoid actuator. The braking force holding mechanism includes a holding member configured to move based on the driving of the solenoid actuator to restrict the rotation of the ratchet gear, and an engagement member coupled with this holding member. The engagement member is rotatably supported on a gear housing portion, and is configured to prohibit a movement of the holding member. Due to this configuration, an excitation force applied from outside to the holding member can be canceled out with the aid of the engagement member, and thus the disk brake can realize a size reduction and achieve cost saving.

9 Claims, 6 Drawing Sheets

(51) Int. Cl.
*F16D 121/24* (2012.01)
*F16D 127/06* (2012.01)

(56) References Cited

U.S. PATENT DOCUMENTS

| | | | | |
|---|---|---|---|---|
| 6,267,207 B1* | 7/2001 | Fleischer | ................ | B60T 7/107 |
| | | | | 188/106 P |
| 6,626,270 B2* | 9/2003 | Drennen | ................ | F16D 65/18 |
| | | | | 188/72.1 |
| 6,915,883 B2* | 7/2005 | Watanabe | ............... | B60T 1/005 |
| | | | | 188/71.9 |
| 7,540,571 B2* | 6/2009 | Yamaguchi | ............. | B60T 1/005 |
| | | | | 188/71.9 |
| 7,677,367 B2* | 3/2010 | Usui | ....................... | F16D 65/18 |
| | | | | 188/72.3 |
| 7,828,124 B2* | 11/2010 | Sano | ....................... | B60T 8/885 |
| | | | | 188/162 |
| 8,037,972 B2* | 10/2011 | Fujita | ............. | B60W 30/18109 |
| | | | | 188/161 |
| 8,240,448 B2* | 8/2012 | Hongawara | ........... | F16D 63/006 |
| | | | | 192/219.5 |
| 8,387,759 B2* | 3/2013 | Prix | .................... | F16H 63/3416 |
| | | | | 192/219.5 |
| 8,678,147 B2* | 3/2014 | Usui | ....................... | F16D 65/18 |
| | | | | 188/72.3 |
| 9,238,452 B2* | 1/2016 | Hyde | ....................... | B60T 1/005 |
| 10,458,498 B2* | 10/2019 | Sala | ....................... | F16D 65/18 |
| 2003/0066719 A1* | 4/2003 | Watanabe | ............... | F16D 65/18 |
| | | | | 188/162 |
| 2005/0077782 A1* | 4/2005 | Horiuchi | ............... | B60T 13/741 |
| | | | | 303/20 |
| 2005/0258683 A1 | 11/2005 | Yamaguchi | | |
| 2010/0051395 A1* | 3/2010 | Sano | ..................... | B60T 13/741 |
| | | | | 188/162 |
| 2012/0138419 A1* | 6/2012 | Kim | ..................... | F16H 63/3416 |
| | | | | 192/219.5 |
| 2017/0130839 A1* | 5/2017 | Takei | ..................... | B60T 1/005 |
| 2017/0234380 A1* | 8/2017 | Yasui | ..................... | F16D 63/006 |
| | | | | 188/72.1 |
| 2018/0009420 A1* | 1/2018 | Tsukamoto | ........... | B60T 13/741 |
| 2018/0073584 A1* | 3/2018 | Tsukamoto | ........... | F16D 63/006 |
| 2018/0135710 A1* | 5/2018 | Sala | ........................ | B60T 13/741 |
| 2018/0148022 A1* | 5/2018 | Misumi | ................... | B60T 8/171 |
| 2020/0217379 A1* | 7/2020 | Odaira | .................. | F16D 65/183 |

FOREIGN PATENT DOCUMENTS

| | | |
|---|---|---|
| JP | 2008-249057 | 10/2008 |
| JP | 2018-70111 | 5/2018 |

OTHER PUBLICATIONS

Written Opinion of the International Searching Authority issued Jun. 16, 2020 in corresponding International Application No. PCT/JP2020/011941, with English translation.

* cited by examiner

DISK BRAKE

TECHNICAL FIELD

The present invention relates to a disk brake used to brake a vehicle.

BACKGROUND ART

As a conventional disk brake including a parking brake mechanism, for example, an electric disk brake discussed in PTL 1 is configured in such a manner that, in a parking brake mechanism thereof, the product of the mass of an engagement claw member and the distance from the rotational center to the center of gravity of the engagement claw member, and the product of the mass of a plunger of a solenoid actuator and the distance from the rotational center to the center of gravity of the plunger become equal to each other as closely as possible, i.e., the position of the center of gravity of the whole including movable portions including the engagement claw member and the plunger coupled therewith is disposed approximately in vicinity of a straight line extending in parallel with the direction of an acceleration a and passing through the rotational center of the engagement claw member. As a result, almost no moment force M is generated (M≈0) on the engagement claw member with respect to the acceleration a, and therefore the electric disk brake can be configured to reduce the spring force of the compression spring and the thrust force and the holding force of the solenoid actuator.

CITATION LIST

Patent Literature

PTL 1: Japanese Patent Application Public Disclosure No. 2008-249057

SUMMARY OF INVENTION

Technical Problem

However, the electric disk brake according to the above-described patent literature, PTL 1 raises the necessity of setting the mass and the position of the center of gravity of the engagement claw member according to the mass and the position of the center of gravity of the plunger of the solenoid actuator, thereby bringing the possibility of a size increase. On the other hand, an attempt to avoid the size increase leads to the necessity of increasing the mass of the engagement claw member, thereby requiring the engagement claw member having a complicated shape to be made from metal, thus ending up undesirably increasing processing cost.

Solution to Problem

An object of the present invention is to provide a disk brake capable of realizing a size reduction and achieving cost saving.

According to one aspect of the present invention, a disk brake is configured to transmit a driving force from an electric motor to a piston via a transmission mechanism, thereby thrusting forward this piston and pressing a braking member against a braking receiving member. The disk brake includes a braking force holding mechanism configured to restrict a rotation of the transmission mechanism to hold a braking force based on driving of a solenoid actuator. The braking force holding mechanism includes a holding member configured to move based on the driving of the solenoid actuator to restrict the rotation of the transmission mechanism, and an engagement member coupled with this holding member. The engagement member is rotatably supported on a housing, and is configured to prohibit a movement of the holding member.

Further, according to one aspect of the present invention, a disk brake is configured to transmit a driving force from an electric motor to a piston via a transmission mechanism, thereby thrusting forward this piston and pressing a braking member against a braking receiving member. The disk brake includes a braking force holding mechanism configured to restrict a rotation of the transmission mechanism to hold a braking force based on driving of a solenoid actuator. The braking force holding mechanism includes a holding member configured to move based on the driving of the solenoid actuator to restrict the rotation of the transmission mechanism, and an engagement member coupled with this holding member and configured to prohibit a movement of the holding member. The engagement member integrally includes a coupled portion coupled with the holding member, a support portion rotatably supported on a housing, and a weight portion. The weight portion is located on an opposite side of the support portion from the coupled portion.

Further, according to one aspect of the present invention, a disk brake is configured to transmit a driving force from an electric motor to a piston via a transmission mechanism, thereby thrusting forward this piston and pressing a braking member against a braking receiving member. The disk brake includes a braking force holding mechanism configured to restrict a rotation of the transmission mechanism to hold a braking force based on driving of a solenoid actuator. The braking force holding mechanism includes a holding member configured to move based on the driving of the solenoid actuator to restrict the rotation of the transmission mechanism, and an engagement member coupled with this holding member and configured to prohibit a movement of the holding member. The engagement member is rotatably supported on a housing between a center of gravity of this engagement member and a coupled portion with the holding member.

Advantageous Effects of Invention

According to the one aspect of the present invention, the disk brake can realize a size reduction and achieve cost saving.

DESCRIPTION OF EMBODIMENTS

In the following description, embodiments of the present invention will be described in detail with reference to FIGS. 1 to 7.

A disk brake 1 according to an embodiment of the present invention is an electric brake apparatus that generates a braking force based on driving of an electric motor 40 when a vehicle runs normally. In the following description, the disk brake 1 will be described, referring to the internal side of the vehicle (an inner side) as one end side (a cover member 39 side), and the external side of the vehicle (an outer side) as the other end side (a disk rotor D side) as necessary. In other words, the disk brake 1 will be described, referring to the right side as the one end side and the left side as the other end side as necessary in FIGS. 1 and 2.

Figure 1:
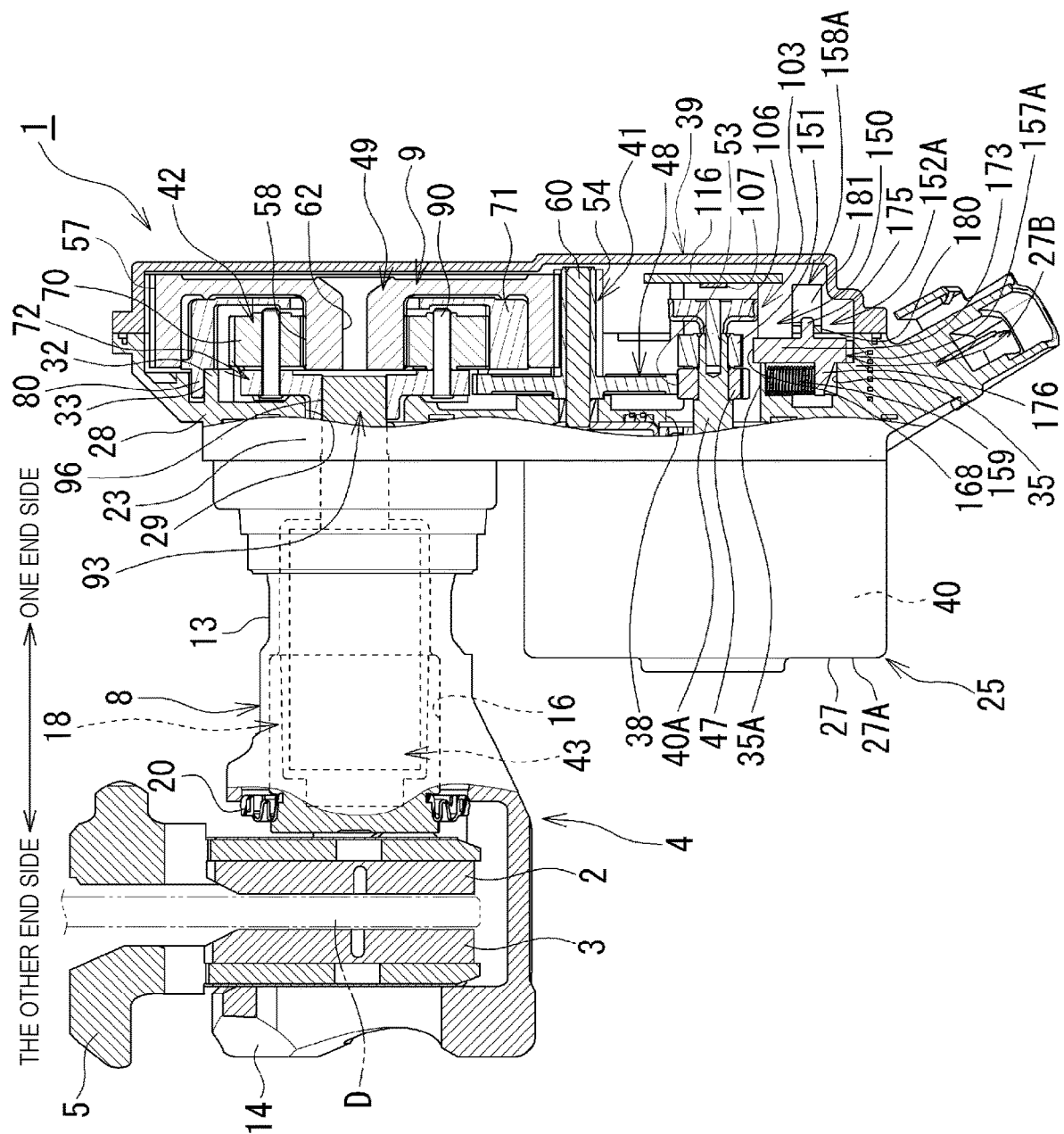
FIG. 1 is a cross-sectional view of main portions of a disk brake according to an embodiment of the present invention.

As illustrated in FIG. 1, the disk brake 1 according to the present embodiment includes a pair of inner and outer brake pads 2 and 3 and a caliper 4. The pair of inner and outer brake pads 2 and 3 is disposed on the both axial sides of a disk rotor D, and serves as a braking member. The disk rotor D is mounted on a rotatable portion of the vehicle and serves as a braking receiving member. The present disk brake 1 is configured as a floating caliper-type disk brake. The pair of inner and outer brake pads 2 and 3, and the caliper 4 are supported on a bracket 5, which is fixed to a non-rotatable portion such as a knuckle of the vehicle, movably in the axial direction of the disk rotor D.

As illustrated in FIG. 1, the caliper 4 includes a caliper main body 8 and a transmission mechanism 9. The caliper main body 8 is a main body of the caliper 4. The transmission mechanism 9 transmits a rotation from the electric motor 40 to a piston 18 in a cylinder portion 13 of the caliper main body 8, thereby applying a thrust force to this piston 18. The caliper main body 8 includes the cylindrical cylinder portion 13 and a pair of claw portions 14 and 14. The cylinder portion 13 is disposed on the proximal end side facing the inner brake pad 2 on the inner side of the vehicle, and is opened toward this inner brake pad 2. The pair of claw portions 14 and 14 extends from the cylinder portion 13 to the outer side across over the disk rotor D, and is disposed on the distal end side facing the outer brake pad 3.

The piston 18 is contained non-rotatably and axially movably relative to the cylinder portion 13 in the cylinder portion 13 of the caliper main body 8, i.e., a cylinder bore 16 of the cylinder portion 13. The piston 18 functions to press the inner brake pad 2, and is formed into a bottomed cupped shape. This piston 18 is contained in the cylinder bore 16 of the cylinder portion 13 in such a manner that the bottom portion thereof faces the inner brake pad 2. The piston 18 is supported non-rotatably relative to the cylinder bore 16 and thus the caliper main body 8 with the aid of engagement prohibiting a rotation between the bottom portion of the piston 18 and the inner brake pad 2.

A seal member (not illustrated) is disposed in the cylinder bore 16 of the cylinder portion 13 on the inner peripheral surface thereof on the other end side. Then, the piston 18 is contained in the cylinder bore 16 axially movably in a state in contact with this seal member. A dust boot 20 is interposed between the outer peripheral surface of the piston 18 on the bottom portion side thereof and the inner peripheral surface of the cylinder bore 16 on the other end side thereof. The disk brake 1 is configured to prevent an entry of a foreign object into the cylinder bore 16 of the cylinder portion 13 with the aid of these seal member and dust boot 20.

A gear housing 25 is integrally coupled with the bottom wall 23 side (the one end side) of the cylinder portion 13 of the caliper main body 8. The electric motor 40, a multi-stage spur reduction mechanism 41 and a planetary gear reduction mechanism 42, which will be described below, are disposed inside this gear housing 25. The gear housing 25 includes a first gear housing portion 27 and a second gear housing portion 28. The first gear housing portion 27 mainly contains the electric motor 40. The second gear housing portion 28 mainly contains the planetary gear reduction mechanism 42. The first gear housing portion 27 includes a motor housing portion 27A and a gear housing portion 27B. The electric motor 40 is contained in the motor housing portion 27A. A rotational shaft 40A extending from the electric motor 40 in this motor housing 27A is disposed in the gear housing portion 27B. As understood from FIG. 3, a containing recessed portion 35 is formed in the gear housing portion 27B at a position close to a pinion gear 47 of the multi-stage spur reduction mechanism 41, which will be described below. The containing recessed portion 35 is provided to contain a compression coil spring 159 of a braking force holding mechanism 152A, which will be described below. Further, a support pin 36 is provided in a manner protruding toward the one end side in the gear housing portion 27B at a position close to the containing recessed portion 35. Further, a containing portion 37 is formed in the gear housing portion 27B at a position close to the containing recessed portion 35. The containing portion 37 is provided to contain a solenoid actuator 155 of the braking force holding mechanism 152A, which will be described below.

As illustrated in FIG. 1, a bottom wall 23 of the cylinder portion 13 is integrally coupled with the second gear housing portion 28 from the other end side thereof. As a result, the cylinder portion 13 and the motor housing portion 27A of the first gear housing portion 27 (the electric motor 40) are disposed so as to be arranged generally in parallel with each other. An insertion hole 29 is formed on the second gear housing portion 28. A small-diameter cylindrical portion 86 of a carrier 72 including a spindle 93, which will be described below, is inserted through the insertion hole 29. A cylindrical restriction portion 32 is provided in a manner protruding from the bottom surface of the second gear housing portion 28. The cylindrical restriction portion 32 restricts a radial movement of an internal gear 71, which will be described below. An annular groove portion 33 is formed on the radially outer side of this cylindrical restriction portion 32 between the cylindrical restriction portion 32 and a wall surface facing this cylindrical restriction portion 32. A plurality of engagement recessed portions (not illustrated) is formed on the wall surface facing the cylindrical restriction portion 32 at circumferential intervals. A cutout portion (not illustrated) is formed on this cylindrical restriction portion 32 so as to avoid interference with a large-diameter gear 53 of a first reduction gear 48, which will be described below. The opening of the gear housing 25 on the one end side is closed by a cover member 39. This cover member 39 is air-tightly attached to the gear housing 25.

The rotation from the electric motor 40 is transmitted to the piston 18 via the transmission mechanism 9. The transmission mechanism 9 includes the rotational shaft 40A, the multi-stage spur reduction mechanism 41 and the planetary gear reduction mechanism 42, and a rotation-linear motion conversion mechanism 43. The rotational shaft 40A extends from the electric motor 40. The multi-stage spur reduction mechanism 41 and the planetary gear reduction mechanism 42 power up the rotational torque from the electric motor 40. The rotation-linear motion conversion mechanism 43 converts the rotation from this planetary gear reduction mechanism 42 into a linear motion and applies the thrust force to the piston 18. Also referring to FIG. 2, the electric motor 40 is disposed in the motor housing portion 27A of the first gear housing portion 27 as described above, and the rotational shaft 40A thereof is inserted through a through-hole 38 of the gear housing portion 27B and extends into the gear housing portion 27B. The multi-stage spur reduction mechanism 41 includes the pinion gear 47, the first reduction gear 48, and a second reduction gear 49. The first reduction gear 48 and the second reduction gear 49 are made from metal, or resin such as fiber-reinforced resin.

Figure 2:
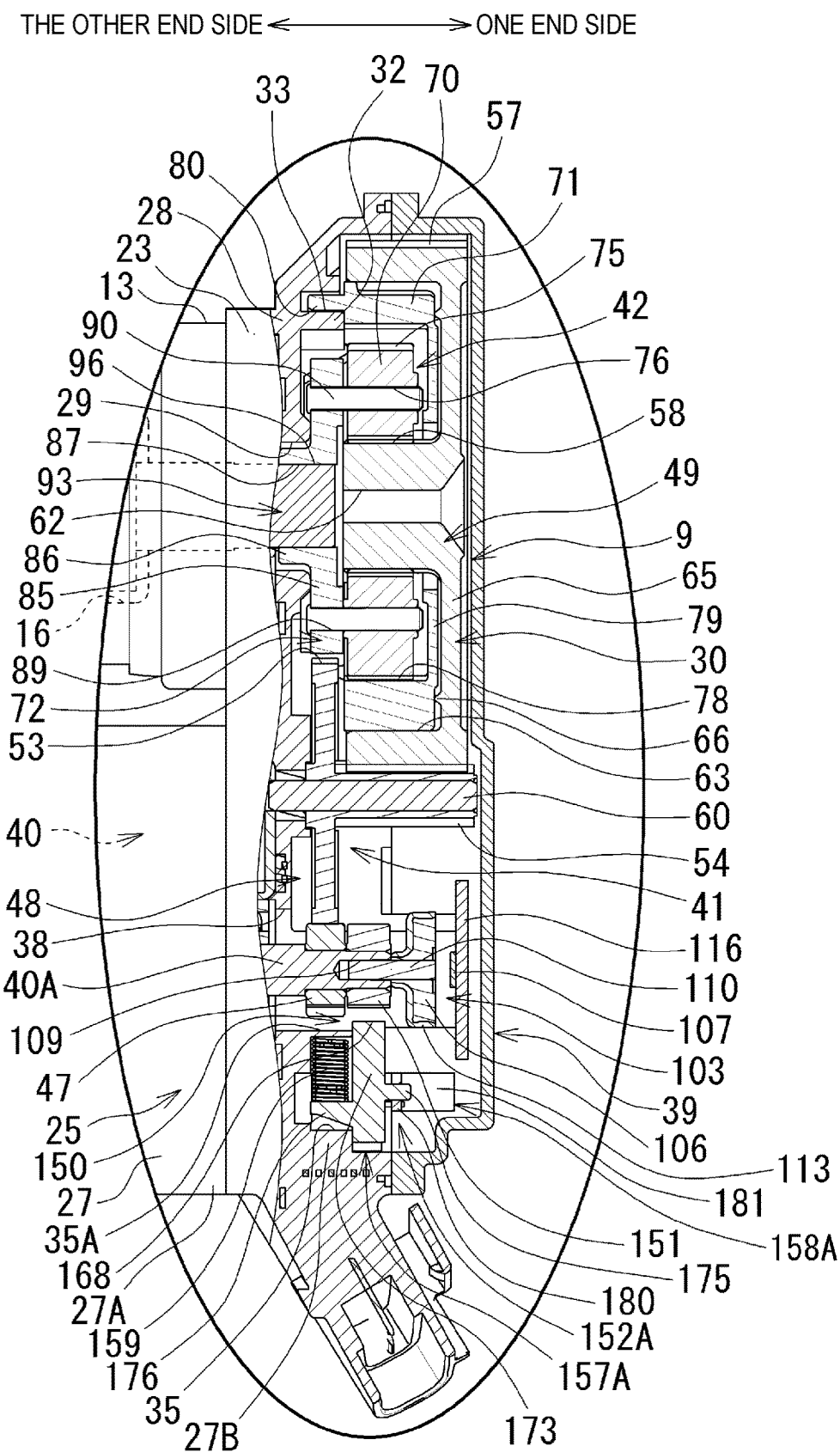
FIG. 2 is an enlarged view of main portions illustrated in FIG. 1.

As illustrated in FIG. 2, the pinion gear 47 is cylindrically formed, and is fixedly press-fitted to the rotational shaft 40A of the motor 40. The first reduction gear 48 is formed by a stepped gear. This first reduction gear 48 includes the large-diameter gear 53 and a small-diameter gear 54. The large-diameter gear 53 is meshed with the pinion gear 47, and is large in diameter. The small-diameter gear 54 extends axially from the large-diameter gear 53 toward the one end side coaxially, and is small in diameter. This first reduction gear 48 is arranged in such a manner that the large-diameter gear 53 thereof extends across the first gear housing portion 27 and the second gear housing portion 28 so as to enter in the cutout portion (not illustrated) provided on the cylindrical restriction portion 32 of the second gear housing portion 28 and a cutout portion (not illustrated) provided on a cylindrical wall portion 80 of the internal gear 71. As a result, the outer peripheral surface of the large-diameter gear 53 of the first reduction gear 48 is disposed so as to face in vicinity to the outer peripheral surface of a larger-diameter annular plate-like portion 85 of the carrier 72, which will be described below. The first reduction gear 48 is rotatably supported by a support rod 60. This support rod 60 is fixedly press-fitted to the gear housing portion 27B of the first gear housing portion 27. The small-diameter gear 54 is formed so as to have a substantially longer axial length than the axial length of the large-diameter gear 53. The axial length of the small-diameter gear 54 is approximately equal to the axial length of a large-diameter gear 57 of the second reduction gear 49, which will be described below.

The small-diameter gear 54 of the first reduction gear 48 is meshed with the second reduction gear 49. This second reduction gear 49 includes the large-diameter gear 57 and a sun gear 58. The large-diameter gear 57 is meshed with the small-diameter gear 54 of the first reduction gear 48, and is large in diameter. The sun gear 58 extends axially from the large-diameter gear 57 toward the other end side coaxially, and is small in diameter. The second reduction mechanism 49 is contained in the second gear housing portion 28. A through-hole 62 is formed at a radially central portion of the second reduction gear 49. The through-hole 62 axially extends therethrough. The sun gear 58 is configured as a part of the planetary gear reduction mechanism 42. The large-diameter gear 57 and the sun gear 58 are approximately equal to each other in axial length thereof. An annular space 63 is formed between the inner peripheral surface of the large-diameter gear 57 and the outer peripheral surface of the sun gear 58. One end of the large-diameter gear 57 of the second reduction gear 49 and one end of the sun gear 58 are connected to each other via a ring-like annular wall portion 65. An annular stopper portion 66 is formed on the surface of this annular wall portion 65 on the other end side at a position closer to the outer peripheral end thereof. The stopper portion 66 protrudes toward the planetary gear reduction mechanism 42 side (the other end side).

The planetary gear reduction mechanism 42 includes the sun gear 58 of the second reduction gear 49, a plurality of planetary gears 70 (five gears in the present embodiment), and the internal gear 71. A rotation from the planetary gear reduction mechanism 42, i.e., a rotation from each of the planetary gears 70 is transmitted to the carrier 72. Each of the planetary gears 70 includes a gear 75 and a hole portion 76. The gear 75 is meshed with the sun gear 58 and inner teeth 78 of the internal gear 71. A pin 90 erected from the carrier 72 is rotatably inserted through the hole portion 76. These planetary gears 70 are arranged at circumferentially even intervals around the sun gear 58. More specifically, these planetary gears 70 are arranged at circumferentially even intervals in the annular space 63 between the inner peripheral surface of the large-diameter gear 57 and the outer peripheral surface of the sun gear 58, and the gears 75 thereof are meshed with the sun gear 58 and the inner teeth 78 of the internal gear 71.

The internal gear 71 includes the inner teeth 78, the annular wall portion 79, and the cylindrical wall portion 80. The inner teeth 78 are meshed with the respective gears 75 of the planetary gears 70, respectively. The annular wall portion 79 radially centrally extends continuously from one end of these inner teeth 78 and restricts an axial movement of each of the planetary gears 70. The cylindrical wall portion 80 extends from the inner teeth 78 toward the other end side. The portion of the inner teeth 78 of the internal gear 71 is disposed between the inner peripheral surface of the large-diameter gear 57 of the second reduction gear 49 and each of the planetary gears 70. As a result, the second reduction gear 49 is supported rotatably relative to the internal gear 71. The surfaces of the portion of the inner teeth 78 of the internal gear 71, each of the planetary gears 70, and the sun gear 58 on the other end side are generally coplanarly located. A plurality of engagement protrusion portions (not illustrated) is formed on the cylindrical wall portion 80 of the internal gear 71 at circumferential intervals. The engagement projection portions are provided in a radially outwardly protruding manner.

The cutout portion (not illustrated) is formed at a circumferential part of the cylindrical wall portion 80 of the internal gear 71 so as to avoid interference with the large-diameter gear 53 of the first reduction gear 48. Then, while one end surface of the cylindrical wall portion 80 of the internal gear 71 is brought into abutment with the bottom surface of the second gear housing portion 28, the inner peripheral surface of this cylindrical wall portion 80 is brought into abutment with the outer peripheral surface of the cylindrical restriction portion 32 of the second gear housing portion 28. Along therewith, each of the engagement protrusion portions provided in a manner protruding from the cylindrical wall portion 80 is engaged with each of the engagement recessed portions provided on the wall surface of the second gear housing portion 28. Further, the annular stopper portion 66 provided on the annular wall portion 65 of the second reduction gear 49 is brought into abutment with the surface of the internal gear 71 on the one end side. As a result, the internal gear 71 is supported so as to be restricted from moving radially and axially and also prohibited from rotating relative to the gear housing 25.

The carrier 72 includes the large-diameter annular plate-like portion 85 and a small-diameter cylindrical portion 86. The small-diameter cylindrical portion 86 is provided in a manner concentrically protruding from the large-diameter annular plate-like portion 85 toward the other end side. The carrier 72 includes a spline hole portion 87 formed at approximately the radial center thereof so as to axially extend therethrough. The large-diameter annular plate-like portion 85 is disposed on the inner side of the cylindrical restriction portion 32 of the second gear housing portion 28. A plurality of pin hole portions 89 is formed on the outer peripheral side of the large-diameter annular plate-like portion 85 of the carrier 72 at circumferential intervals in correspondence with each of the planetary gears 70. The pins 90 are fixedly press-fitted in these pin hole portions 89, respectively. These pins 90 are rotatably inserted through the respective hole portions 76 of the planetary gears 70, respectively. The small-diameter cylindrical portion 86 of the carrier 72 is inserted through the insertion hole 29 of the second gear housing portion 28.

The spindle 93 is configured to receive a rotation from the carrier 72 and transmit the rotational torque thereof to the rotation-linear motion conversion mechanism 43. A spline shaft portion 96 is integrally connected to one end of the spindle 93. The spline shaft portion 96 is engaged with the spline hole portion 87 of the carrier 72. The spindle 93 extends in the cylinder bore 16, and is coupled with the rotation-linear motion conversion mechanism 43. The spline shaft portion 96 of the spindle 93 is engaged with the spline hole portion 87 of the carrier 72, thereby allowing the carrier 72 and the spindle 93 to transmit the rotational torque to each other therebetween.

Figure 4:
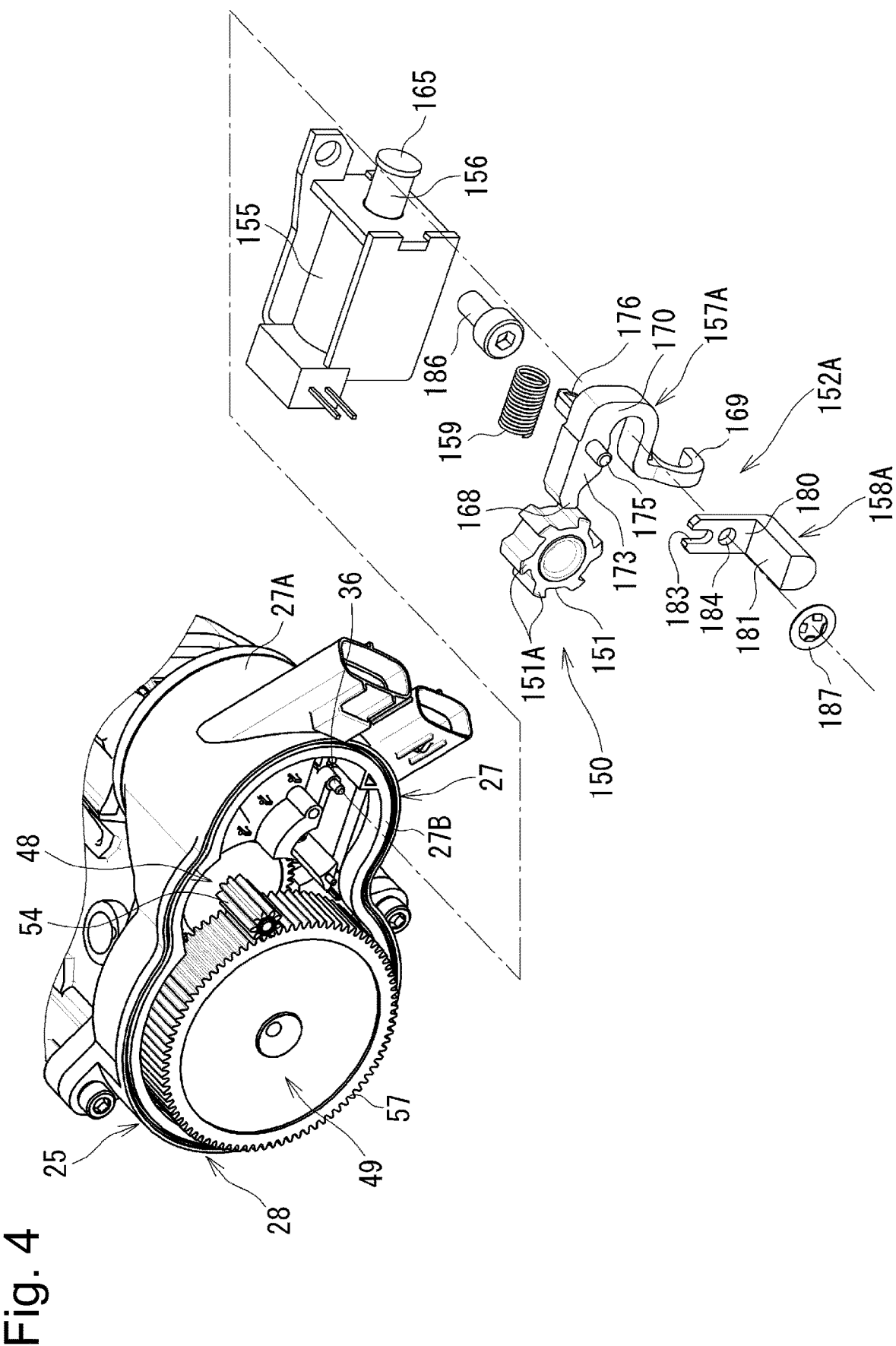
FIG. 4 is an exploded perspective view of a parking brake unit employed in the disk brake according to the present embodiment.

Further, as illustrated in FIGS. 2 and 4, a parking brake unit 150 is provided in the gear housing portion 27B of the first gear housing portion 27. The parking brake unit 150 includes a ratchet gear 151 and a braking force holding mechanism 152A. The ratchet gear 151 is fixedly press-fitted to one end of the rotational shaft 40A, which is the transmission mechanism 9. The braking force holding mechanism 152A holds a braking force by restricting a rotation of the ratchet gear 151 in a direction for releasing the braking force based on driving of the solenoid actuator 155. The ratchet gear 151 is fixedly press-fitted to the one end of the rotational shaft 40A that protrudes from the pinion gear 47. The braking force holding mechanism 152A includes the solenoid actuator 155, a holding member 157A, an engagement member 158A, and a compression coil spring 159. The holding member 157A moves based on the driving of this solenoid actuator 155 to restrict the rotation of the ratchet gear 151 in the direction for releasing the braking force. The engagement member 158A is coupled with this holding member 157A, is rotatably supported on the support pin 36 provided to the gear housing portion 27B of the first housing 27, and prohibits a movement of the holding member 157A toward the ratchet gear 151 side. The compression coil spring 159 serves as an elastic member that biases the holding member 157A in a direction away from the ratchet gear 151.

The solenoid actuator 155 includes a plunger 156. Also referring to FIG. 5, the plunger 156 extends in a direction perpendicular to the rotational shaft 40A of the electric motor 40 and along the longitudinal direction of the cover member 39 (the longitudinal direction of the gear housing 25). An annular flange portion 165 is formed at the distal end of the plunger 156. The plunger 156 of the solenoid actuator 155 moves so as to sink into the main body of the solenoid actuator 155 in reaction to power supply to the solenoid actuator 155. The solenoid actuator 155 is actuated based on an instruction from a control board 116, which will be described below.

Figure 5:
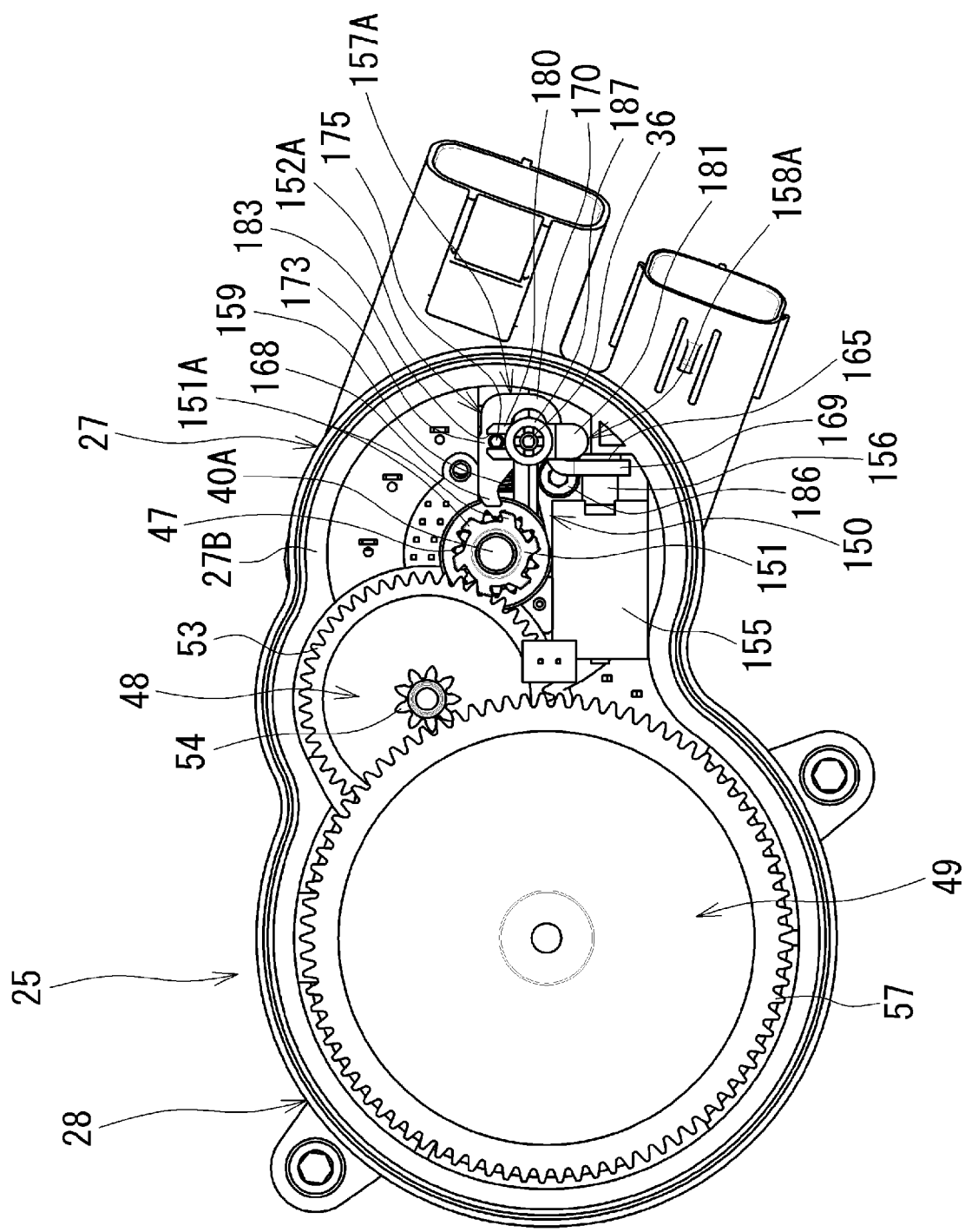
FIG. 5 is a plan view in a state that the parking brake unit employed in the disk brake according to the present embodiment is mounted in a second housing.

Referring to FIGS. 4 and 5, the holding member 157A has a complicated shape, and integrally includes a claw portion 168, a plunger connection portion 169, and a curved portion 170. The claw portion 168 is engageable with the gear portion 151A of the ratchet gear 151. The plunger connection portion 169 is connected to the inner side of the annular flange portion 165 of the plunger 156 of the solenoid actuator 155. The curved portion 170 is provided between the claw portion 168 and the plunger connection portion 169, and extends in a curved manner in a planar view. A shaft portion 173 is integrally connected to the claw portion 168. The shaft portion 173 extends in the same direction as the direction in which the plunger 156 of the solenoid actuator 155 extends. The curved portion 170 is integrally connected to the shaft portion 173 at the end portion thereof opposite from the claw portion 168.

The curved portion 170 extends in a U-shaped manner in the planar view as if being folded back from the shaft portion 173, and is formed in such a manner that the opening side thereof faces the ratchet gear 151 side. The plunger connection portion 169 is integrally connected to the end portion of the curved portion 170. The plunger connection portion 169 is formed into a semicircular arc shape so as to support the outer peripheral surface of the plunger 156 on the inner side of the annular flange portion 165 as if surrounding it from the cover member 39 side. A pin 175 is integrally connected to the shaft portion 173. The pin 175 is provided in a manner protruding toward the cover member 39 side (the one end side). Further, a plate-like pressing portion 176 is integrally connected to the shaft portion 173. The pressing portion 176 is provided in a manner protruding toward the electric motor 40 side (the other end side).

The engagement member 158A is formed into a generally L-like shape including a plate-like portion 180 and a weight portion 181 extending from the proximal end portion of the plate-like portion 180 toward the cover member 39 side (the one end side). The plate-like portion 180 is formed into a generally rectangular shape, and the longitudinal direction thereof approximately matches a direction perpendicular to the direction in which the plunger 156 extends. An engagement groove portion 183 having a U-like shape in a planar view is formed at the distal end of the plate-like portion 180. The pin 175 of the holding member 157A is engaged with this engagement groove portion 183, by which these members 158A and 157A are coupled with each other rotatably around the pin 175. This engagement groove portion 183 functions as a coupled portion coupled by being engaged with the pin 175 of the holding member 157A.

A support hole 184 is formed at an approximately longitudinally central portion of the plate-like portion 180. The support pin 36, which is provided on the gear housing portion 27B of the first housing 27, is inserted through this support hole 184. As a result, the engagement member 158A is supported on the gear housing portion 27B rotatably around the support hole 184 (the support pin 36). This support hole 184 functions as a support portion for rotatably supporting the engagement member 158A on the gear housing portion 27B of the first housing 27. The weight portion 181 is formed into a D-like shape in cross section. A linear portion of the weight portion 181 is directed toward the plate-like portion 180 side. The center of gravity of the engagement member 158A is located at this weight portion 181. The weight portion 181 is positioned on the opposite side of the support hole 184 from the engagement groove 183.

Figure 3:
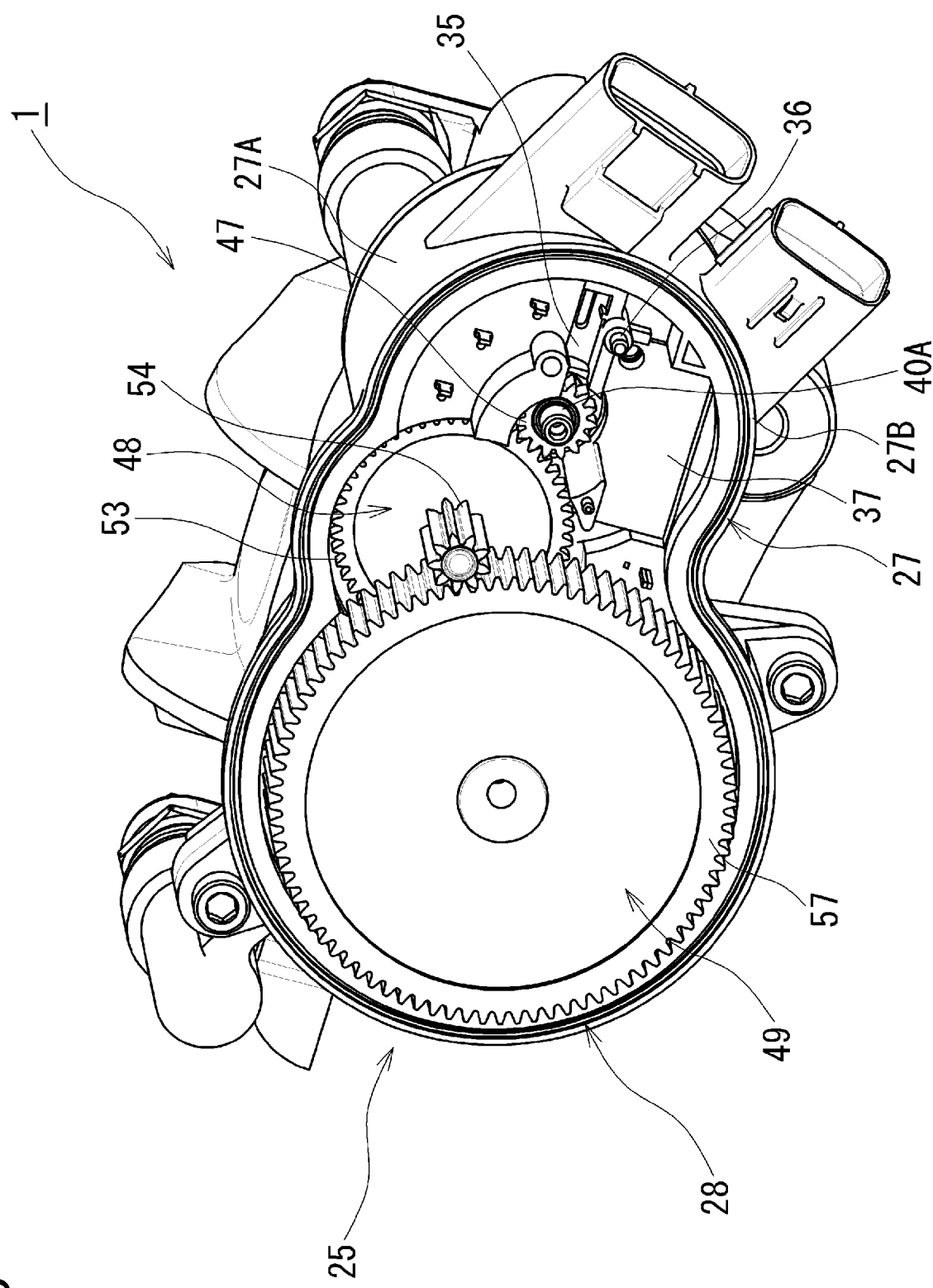
FIG. 3 is a perspective view illustrating the inside of a housing of the disk brake according to the present embodiment.

Then, as illustrated in FIGS. 3 and 5, the solenoid actuator 155 is placed in the containing portion 37 of the gear housing portion 27B of the first housing 27, and is fixed with use of an attachment bolt 186. In this case, the plunger 156 extends along the longitudinal direction of the cover member 39 (the longitudinal direction of the gear housing 25). Further, also referring to FIG. 2, the compression coil spring 159 is placed in the containing recessed portion 35 of the gear housing portion 27B. In this case, the compression coil spring 159 is placed in such a manner that one end portion thereof is in abutment with the wall surface 35A of the containing recessed portion 35, which is located close to the ratchet gear 151. Further, the holding member 157A is placed on the cover member 39 side (the one end side) of the compression coil spring 159. More specifically, the holding member 157A is placed in such a manner that the claw portion 168 thereof faces the outer peripheral surface of the ratchet gear 151 and the shaft portion 173 thereof overlaps the compression coil spring 159. Further, the holding member 157A is placed in such a manner that the pressing portion 176 thereof is in abutment with the other end portion of the compression coil spring 159.

Further, the semicircular arcuate plunger connection portion 169 of the holding member 157A is connected to the outer peripheral surface of the plunger 156 on the inner side of the annular flange portion 165 as if surrounding it from the cover member 39 side. As a result, the support pin 36, which is provided in a manner protruding from the gear housing portion 27B of the first housing 27, is located on the inner side of the curved portion 170 of the holding member 157A. Further, the engagement member 158A is disposed on the cover member 39 side of the holding member 157A in such a manner that the longitudinal direction of the plate-like portion 180 thereof approximately matches the direction perpendicular to the direction in which the plunger 156 extends. Then, the pin 175 of the holding member 157A is engaged in the engagement groove portion 183 having the U-like shape in the planar view, which is provided at the distal end of the plate-like portion 180 of the engagement member 158A, by which these members 158A and 157A are coupled with each other rotatably around the pin 175. Further, the support pin 36, which is provided in a manner protruding from the gear housing portion 27B of the first housing 27, is inserted through in the support hole 184 provided on the plate-like portion 180 of the holding member 157A, and a detachment prevention ring 187 is mounted on the distal end portion of the support pin 36. As a result, the engagement member 158A is supported rotatably around the support pin 36, which is provided in a manner protruding from the gear housing portion 27B of the first housing 27.

Due to the employment of such a configuration, first, the claw portion 168 of the holding member 157A is biased by the compression coil spring 159 in the direction away from the ratchet gear 151 under normal circumstances. Further, when an excitation force from outside is applied to the holding member 157A under these normal circumstances, a force canceling out the excitation force from outside can be applied to the holding member 157A with the aid of the weight portion 181 of the engagement member 158A. More specifically, when the excitation force is applied to the holding member 157A in a direction for moving the claw portion 168 thereof toward the outer peripheral surface of the ratchet gear 151, a force is applied to the engagement member 158A so as to rotate the engagement member 158A around the support hole 184 (the support pin 36) in the counterclockwise direction in FIG. 5, i.e., a force is applied to the engagement member 158A so as to move the weight portion 181 (the center of gravity) of the engagement member 158A in a direction opposite from the direction in which the excitation force is applied to the holding member 157A. As a result, the force can be applied to the holding member 157A in the direction for separating the claw portion 168 thereof away from the outer peripheral surface of the ratchet gear 151 (the force for prohibiting the claw portion 168 from moving toward the outer peripheral surface of the ratchet gear 151) with the aid of the weight portion 181 of the engagement member 158A, and thus the excitation force applied from outside to the holding member 157A can be canceled out with the aid of the weight portion 181 of the engagement member 158A.

This situation occurs when the excitation force applied to the holding member 157A exceeds the biasing force of the compression coil spring 159. Next, when the parking brake is actuated to keep the vehicle in a stopped state, the plunger 156 of the solenoid actuator 155 sinks in due to power supply to the solenoid actuator 155. As a result, the claw portion 168 of the holding member 157A moves toward the outer peripheral surface of the ratchet gear 151 to be engaged with the gear portion 151A thereof while counteracting the biasing force of the compression coil spring 159. At this time, the engagement member 158A rotates around the support pin 36 (the support hole 184) in the counterclockwise direction in FIG. 5. In other words, this means that the weight portion 181 (the center of gravity) of the engagement member 158A moves in the direction opposite from the forward thrust direction of the solenoid actuator 155 (the direction in which the plunger 156 sinks) when the solenoid actuator 155 is actuated.

As illustrated in FIGS. 1 and 2, a rotational angle detector 103 is disposed on the one end side of the ratchet gear 151 of the parking brake unit 150. The rotational angle detector 103 functions to detect the rotational angle of the rotational shaft 40A of the electric motor 40. This rotational angle detector 103 includes a magnet member 106 and a magnetic detection IC chip 107. A press-fitting recessed portion 109 is formed on one end surface of the rotational shaft 40A of the electric motor 40. A support rod 110 is press-fitted in this press-fitting recessed portion 109. The ring-like magnet member 106 is supported on this support rod 110. The magnet member 106 is disposed in a cup-like support member 113. The magnetic detection IC chip 107 is disposed so as to face the one end side of this magnet member 106. The magnetic detection IC chip 107 functions to detect a change in a magnetic field generated from the magnet member 106. This magnetic detection IC chip 107 is mounted on the control board 116. Then, the disk brake 1 calculates and detects the rotational angle of the rotational shaft 40A of the electric motor 40 with use of the control board 116 by detecting a change in the magnetic flux generated from the magnet member 106 rotating according to the rotation of the rotational shaft 40A with use of the magnetic detection IC chip 107.

As illustrated in FIG. 1, the rotation-linear motion conversion mechanism 43 functions to convert the rotational motion from the multi-stage spur reduction mechanism 41 and the planetary gear reduction mechanism 42, i.e., the rotational motion from the spindle 93 into a motion in a linear direction (hereinafter referred to as a linear motion for convenience), thereby applying the thrust force to the piston 18 with the use of this movement of the linear motion member (not illustrated). The rotation-linear motion conversion mechanism 43 is disposed in the cylinder bore 16 between the bottom surface thereof and the piston 18. Then, when the spindle 93 rotates according to the rotation of the carrier 72, the rotation-linear motion conversion mechanism 43 causes the linear motion member thereof to move forward toward the other end side, thereby causing this piston 18 to move forward and thus being able to press the inner brake pad 2 against the disk rotor D with the use of this piston 18.

The driving of the electric motor 40 is controlled according to an instruction from the control board 116. At the time of braking when the vehicle normally runs, the driving of the electric motor 40 is controlled by this control board 116 based on detection signals from a detection sensor responding to a driver's request and various detection sensors that detect various situations requiring the brake, a detection signal from the rotational angle detector 103, and a detection signal from a thrust force sensor (not illustrated) and the like. Further, this control board 116 is electrically connected to a parking brake switch (not illustrated), and the actuation of the solenoid actuator 155 is controlled according to an instruction from the control board 116.

Next, functions of braking the vehicle and releasing the braking when the vehicle runs normally, which are exerted by the disk brake 1 according to the present embodiment, will be described.

At the time of the braking when the vehicle normally runs, the electric motor 40 is driven according to the instruction from the control board 116, and the rotation thereof in a forward direction, i.e., a braking direction is transmitted to the sun gear 58 of the planetary gear reduction mechanism 42 via the multi-stage spur reduction mechanism 41. The rotation of the sun gear 58 of this planetary gear reduction mechanism 42 causes each of the planetary gears 70 to revolve around the rotational axis of the sun gear 58 while rotating around its own rotational axis, thereby causing the carrier 72 to rotate. In other words, the rotation from the electric motor 40 is transmitted to the carrier 72 after being slowed down and powered up at a predetermined speed reduction ratio by being transmitted via the multi-stage spur reduction mechanism 41 and the planetary gear reduction mechanism 42. Then, the rotation from the carrier 72 is transmitted to the spindle 93.

Subsequently, when the spindle 93 rotates according to the rotation of the carrier 72, due to the functionality of the rotation-linear motion conversion mechanism 43, the linear motion member thereof moves forward, thereby causing the piston 18 to move forward. Due to the forward movement of this piston 18, the inner brake pad 2 is pressed against the disk rotor D. Then, due to a reaction force to the pressing force from the piston 18 to the inner brake pad 2, the caliper main body 8 moves to the inner side with respect to the bracket 5, thereby pressing the outer brake pad 3 against the disk rotor D with use of each of the claw portions 14 and 14. As a result thereof, a frictional force is generated with the disk rotor D sandwiched between the pair of inner and outer brake pads 2 and 3, and this eventually leads to generation of a braking force on the vehicle.

On the other hand, at the time of releasing the braking, the rotational shaft 40A of the electric motor 40 rotates in the opposite direction, i.e., a braking release direction according to the instruction from the control board 116, and this rotation in the opposite direction is also transmitted to the spindle 93 via the multi-stage spur reduction mechanism 41 and the planetary gear reduction mechanism 42. As a result, due to the functionality of the rotation-linear motion conversion mechanism 43, the linear motion member thereof moves backward to return to the initial state according to the rotation of the spindle 93 in the opposite direction, and the braking force applied to the disk rotor D by the pair of inner and outer brake pads 2 and 3 is released.

Next, the actuation of the parking brake in the disk brake 1 according to the present embodiment will be described.

When the parking brake switch is operated, the electric motor 40 is driven according to the instruction from the control board 116 and this rotation in the forward direction is transmitted to the carrier 72 via the multi-stage spur reduction mechanism 41 and the planetary gear reduction mechanism 42, similarly to the actuation at the time of the normal braking. Subsequently, when the spindle 93 rotates according to the rotation from the carrier 72, the piston 18 moves forward due to the functionality of the rotation-linear motion conversion mechanism 43, and the disk rotor D is sandwiched between the pair of inner and outer brake pads 2 and 3, as a result of which the braking force is generated.

The plunger 156 of the solenoid actuator 155 sinks in due to power supply to the solenoid actuator 155 according to the instruction from the control board 116 in this state. As a result, the claw portion 168 of the holding member 157A moves toward the outer peripheral surface of the ratchet gear 151 to be engaged with the gear portion 151A thereof while counteracting the biasing force of the compression coil spring 159. This means that the engagement member 158A rotates around the support pin 36 (the support hole 184) in the counterclockwise direction in FIG. 5, and the weight portion 181 (the center of gravity) of the engagement member 158A moves in the direction opposite from the forward thrust direction of the solenoid actuator 155 (the direction in which the plunger 156 sinks in) at this time.

At this time, the gear portion 151A of the ratchet gear 151 and the claw portion 168 of the holding member 157A may fail to be engaged due to interference of the respective top portions with each other, and, therefore the electric motor 40 is next rotated in the braking release direction, thereby ensuring that the gear portion 151A of the ratchet gear 151 and the claw portion 168 of the holding member 157A are engaged. Then, after the power supply to the electric motor 40 is stopped and the pressing force of the pair of brake pads 2 and 3 to the disk rotor D is confirmed, the power supply to the solenoid actuator 155 is stopped and the engaged state is maintained between the gear portion 151A of the ratchet gear 151 and the claw portion 168 of the holding member 157A. This allows the disk brake 1 to maintain the braking state with the power supply stopped for the electric motor 40 and the solenoid actuator 155.

Next, when the actuation of the parking brake is released, the electric actuator 40 is slightly rotated in the braking direction according to the instruction from the control board 116 without power supplied to the solenoid actuator 155, by which the engagement is loosened between the gear portion 151A of the ratchet gear 151 and the claw portion 168 of the holding member 157A, and the holding member 157A moves due to the biasing force of the compression coil sprint 159 in the direction for separating the claw portion 168 thereof away from the outer peripheral surface of the ratchet gear 151 and thus the restriction on the rotation of the ratchet gear 151 is released, as a result of which the piston 18 moves backward due to the rotation of the electric motor 40 in the braking release direction and the braking force applied by the pair of inner and outer brake pads 2 and 3 is released.

In the above-described manner, the disk brake 1 according to the present embodiment, especially, the braking force holding mechanism 152A includes the holding member 157A configured to move based on the driving of the solenoid actuator 155 to restrict the rotation of the ratchet gear 151 in the direction for releasing the braking force, and the engagement member 158A (the weight portion 181) coupled with this holding member 157A. The engagement member 158A is rotatably supported on the support pin 36 provided to the gear housing portion 27B of the first housing 27, and prohibits the movement of the holding member 157A toward the ratchet gear 151 side.

Due to this configuration, when the excitation force is applied to the holding member 157A in the direction for moving the claw portion 168 thereof toward the outer peripheral surface of the ratchet gear 151, the force canceling out this excitation force can be applied to the holding member 157A with the aid of the weight portion 181 of the engagement member 158A. More specifically, when the excitation force is applied to the holding member 157A in the direction for moving the claw portion 168 thereof toward the outer peripheral surface of the ratchet gear 151, the force is applied so as to rotate the engagement member 158A around the support hole 184 (the support pin 36) in the counterclockwise direction in FIG. 5 (so as to move the weight portion 181 of the engagement member 158A in the direction away from the outer peripheral surface of the ratchet gear 151). As a result, the force can be applied to the holding member 157A in the direction for separating the claw portion 168 thereof away from the outer peripheral surface of the ratchet gear 151, i.e., the force can be applied so as to prohibit the movement of the claw portion 168 toward the outer peripheral surface of the ratchet gear 151 with the aid of the weight portion 181 of the engagement member 158A, as a result of which the excitation force applied from outside to the holding member 157A can be canceled out with the aid of the weight portion 181 of the engagement member 158A.

The acquisition of this advantageous effect eliminates the necessity of employing the compression coil spring 159 having a strong biasing force to counteract the excitation force applied in the direction for moving the claw portion 168 of the holding member 157A toward the outer peripheral surface of the ratchet gear 151, thereby allowing the disk brake 1 to maximumly reduce the biasing force of the compression coil spring 159 and achieve a size reduction. Further, since being able to maximumly reduce the biasing force of the compression coil spring 159, the present configuration allows the disk brake 1 to reduce the output of the solenoid actuator 155 at the time of the actuation. In other words, the solenoid actuator 155 can fulfill its role only by having a performance capable of providing an output enough to move the engagement member 158A and the holding member 157A against the biasing force (the slight biasing force) of the compression coil spring 159. This allows the braking force holding mechanism 152A employed in the disk brake 1 according to the present embodiment to have a smaller size than the conventional technique, thereby reducing a space occupied by the braking force holding mechanism 152A. Further, the present configuration allows the holding member 157A having a complicated shape to be made from resin, thereby contributing to reducing the processing expense and reducing the cost.

Further, the disk brake 1 according to the present embodiment includes the compression coil spring 159 configured to biase the holding member 157A in the direction for releasing the restriction on the rotation of the ratchet gear 151, and therefore can easily move the claw portion 168 of the holding member 157A in the direction away from the outer peripheral surface of the ratchet gear 151 when releasing the parking brake.

Further, in the disk brake 1 according to the present embodiment, the engagement member 158A integrally includes the engagement groove portion 183 (a coupled portion) coupled with the holding member 157A, the support hole 184 (a support portion) rotatably supported on the support pin 36 provided in a manner protruding from the gear housing portion 27B, and the weight portion 181. The weight portion 181 is located on the opposite side of the support hole 184 from the engagement groove portion 183. Due to this configuration, when the excitation force is applied to the holding member 157A in the direction for moving the claw portion 168 thereof toward the outer peripheral surface of the ratchet gear 151, the force can be applied to the holding member 157A in the direction for separating the claw portion 168 thereof away from the outer peripheral surface of the ratchet gear 151 with the aid of the engagement member 158A.

Further, in the disk brake 1 according to the present embodiment, the holding member 157A includes the claw portion 168 engageable with the gear portion 151A of the ratchet gear 151, the semicircular arcuate plunger connection portion 169 connected to the plunger 156 of the solenoid actuator 155, and the curved portion 170 provided between the claw portion 168 and the plunger connection portion 169 and extending in the curved manner in the planar view. The support hole 184 provided on the plate-like portion 180 of the engagement member 158A is disposed on the inner side of the curved portion 170 of the holding member 157A. As a result, the braking force holding mechanism 152A can be compactly configured. Further, in the disk brake 1 according to the present embodiment, the engagement member 158A is rotatably supported on the support pin 36, which is provided in a manner protruding from the gear housing portion 27B, between the weight portion 181 (the center of gravity) of this engagement member 158A and the engagement groove portion 183 (the coupled portion) engaged with the holding member 157A. As a result, the braking force holding mechanism 152A can be compactly configured.

Figure 6:
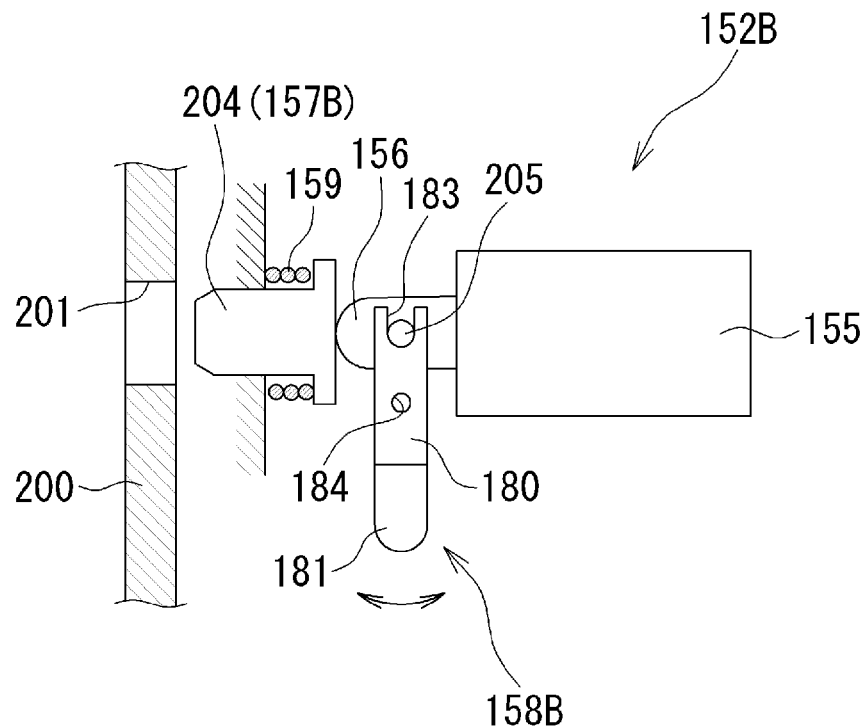
FIG. 6 is a plan view of a braking force holding mechanism of the parking brake unit according to another embodiment.

Next, a braking force holding mechanism 152B according to another embodiment will be described with reference to FIG. 6.

In the braking force holding mechanism 152B according to this other embodiment, a hole portion 201 (or a recessed portion) is provided on a rotational portion 200 of the multi-stage spur reduction mechanism 41, the planetary gear reduction mechanism 42, or the rotation-linear motion conversion mechanism 43, which is the transmission mechanism 9. A stopper pin 204 is provided in this hole portion 201. The stopper pin 204 serves as a holding member 157B having a distal end insertable in the hole portion 201. The rotational portion 200 is restricted from rotating due to the insertion of the stopper pin 204 through the hole portion 201 of the rotational portion 200. The distal end of the plunger 156 of the solenoid actuator 155 is coupled with the proximal end portion of the stopper pin 204. The stopper pin 204 is biased by the compression coil spring 159 in a direction away from the hole portion 201. A pin 205 is provided on the plunger 156 in a protruding manner. An engagement member 158B is formed into the generally L-like shape including the plate-like portion 180 and the weight portion 181 erected from the proximal end of the plate-like portion 180. The engagement groove portion 183 is formed at the distal end of the plate-like portion 180. The pin 205 is engaged with this engagement groove portion 183, and the engagement member 158B is coupled with the plunger 156 rotatably around the pin 205. The support hole 184 is formed at the longitudinally intermediate portion of the plate-like portion 180. A support pin (not illustrated) provided in a manner protruding from the housing or the like is rotatably inserted through this support hole 184, and the engagement member 158B is supported on the housing or the like rotatably around the support hole 184 (the support pin).

Then, when the solenoid actuator 155 is actuated, the plunger 156 projects and also moves forward the stopper pin 204 against the biasing force of the compression coil spring 159, by which the distal end portion thereof is inserted into the hole portion 201 of the rotational portion 200 and restricts a rotation of the rotational portion 200. At this time, the engagement member 158B rotates in the counterclockwise direction in FIG. 6 around the support hole 184 (the support pin) according to the projection of the plunger 156 of the solenoid actuator 155.

In the braking force holding mechanism 152B according to the above-described other embodiment, when an excitation force is applied from outside to the stopper pin 204 in a direction for moving the distal end portion thereof toward the hole portion 201 of the rotational portion 200, a force canceling out this excitation force can also be applied to the stopper pin 204 with the aid of the weight portion 181 of the engagement member 158B similarly to the braking force holding mechanism 152A according to the above-described present embodiment. More specifically, when the excitation force is applied to the stopper pin 204 in the direction for moving the distal end portion thereof toward the hole portion 201 of the rotational portion 200, the force is applied to the engagement member 158B so as to rotate the engagement member 158B around the support hole 184 (the support pin) in the counterclockwise direction in FIG. 6 (so as to move the weight portion 181 of the engagement member 158B in the direction away from the hole portion 201 of the rotational portion 200).

As a result, the force can be applied to the stopper pin 204 in the direction for separating the distal end portion thereof away from the hole portion 201 of the rotational portion 200 with the aid of the weight portion 181 of the engagement member 158B, and thus the excitation force applied from outside to the stopper pin 204 can be canceled out with the aid of the weight portion 181 of the engagement member. This can reduce the size of this braking force holding mechanism 152B, thereby contributing to cost saving.

Next, a braking force holding mechanism 152C according to further another embodiment will be described with reference to FIG. 7.

In the braking force holding mechanism 152C according to the further other embodiment, the holding member 157C is formed by a shaft member. The holding member 157C includes the claw portion 168, a pin 210, a coupled portion 211, and a support hole 212. The claw portion 168 is provided at one axial end portion of the holding member 157C, and is engageable with the gear portion 151A of the ratchet gear 151. The pin 210 is provided at the other axial end of the holding member 157C, and is engaged with an engagement member 158C. The coupled portion 211 is provided close to this pin 210, and is coupled with the plunger 156 of the solenoid actuator 155. The support hole 212 is provided between the coupled portion 211 and the claw portion 168. A support pin (not illustrated) provided in a manner protruding from the housing or the like is inserted through this support hole 212, by which the holding member 157C is supported on the housing or the like rotatably around the support hole 212 (the support pin). The compression coil spring 159 is provided near the coupled portion 211 of the holding member 157C. The compression coil spring 159 biases the holding member 15C in a direction for rotating it around the support hole 212 in the clockwise direction in FIG. 7.

The engagement member 158C is formed into a generally L-like shape including the plate-like portion 180 and the weight portion 181 erected from the proximal end of the plate-like portion 180. The engagement groove portion 183 is formed at the distal end of the plate-like portion 180. The engagement groove portion 183 is engaged with the pin 210 of the holding member 157C. The support hole 184 is formed at the approximately longitudinally intermediate portion of the plate-like portion 180. A support pin (not illustrated) provided in a manner protruding from the housing or the like is inserted through this support hole 184, and the engagement member 158C is supported on the housing or the like rotatably around the support hole 184 (the support pin).

Figure 7:
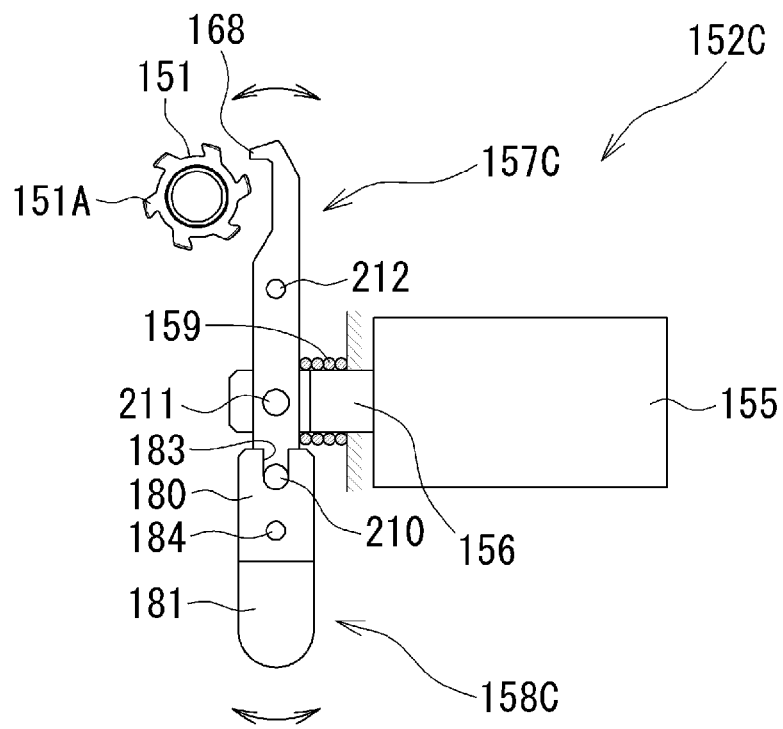
FIG. 7 is a plan view of a braking force holding mechanism of the parking brake unit according to further another embodiment.

Then, when the solenoid actuator 155 is actuated, the plunger 156 sinks in, and, along therewith, the holding member 157C rotates around the support hole 212 (the support pin) in the counterclockwise direction in FIG. 7 while counteracting the biasing force of the compression coil spring 159, and the claw portion 168 is engaged with the gear portion 151A of the ratchet gear 151, thereby restricting the rotation of the ratchet gear 151. At this time, the engagement member 158C rotates around the support hole 184 (the support pin) in the clockwise direction in FIG. 7.

In the braking force holding mechanism 152C according to the above-described further other embodiment, when an excitation force is applied from outside to the holding member 157C in a direction for moving the claw portion 168 thereof toward the outer peripheral surface of the ratchet gear 151, a force canceling out this excitation force can also be applied to the holding member 157C with the aid of the weight portion 181 (the center of gravity) of the engagement member 158C similarly to the braking force holding mechanism 152A according to the above-described present embodiment. More specifically, when the excitation force is applied to the holding member 157C in the direction for moving the claw portion 168 thereof toward the outer peripheral surface of the ratchet gear 151, a force is applied to the holding member 157C so as to rotate it around the support hole 212 (the support pin) in the counterclockwise direction in FIG. 7, and, further, a force is applied to the engagement member 158C so as to rotate it around the support hole 184 (the support pin) in the clockwise direction in FIG. 7.

As a result, the force can be applied to the holding member 157C in the direction for separating the claw portion 168 thereof away from the ratchet gear 151 with the aid of the weight portion 181 of the engagement member 158C, and thus the excitation force applied from outside to the holding member 157C can be canceled out with the aid of the weight portion 181 of the engagement member 158C. This can reduce the size of this braking force holding mechanism 152C, thereby contributing to cost saving.

The present embodiment is employed for the disk brake 1 as the electric brake apparatus in the above description, but the present embodiment may be employed for a disk brake configured in the following manner. When the vehicle is braked while running normally, the disk brake causes the piston 18 to move forward based on a brake hydraulic pressure supplied into the cylinder bore 16 of the caliper main body 8, thereby generating the braking force with use of the pair of inner and outer brake pads 2 and 3. Only at the time of parking brake when, for example, the vehicle is parked, the disk brake transmits the driving force from the electric motor 40 to the piston 18 via the multi-stage spur reduction mechanism 41, the planetary gear reduction mechanism 42, and the rotation-linear motion conversion mechanism 43 to thus move forward this piston 18, thereby generating the braking force with use of the pair of inner and outer brake pads 2 and 3.

Possible configurations as the disk brake 1 based on the present embodiment include the following examples.

According to a first configuration, a disk brake (1) is provided. The disk brake (1) is configured to transmit a driving force from an electric motor (40) to a piston (18) via a transmission mechanism (40A), thereby thrusting forward this piston (18) and pressing a braking member (2 and 3) against a braking receiving member (D). The disk brake (1) includes a braking force holding mechanism (152A) configured to restrict a rotation of the transmission mechanism (40A) to hold a braking force based on driving of a solenoid actuator (155). The braking force holding mechanism (152A) includes a holding member (157A) configured to move based on the driving of the solenoid actuator (155) to restrict the rotation of the transmission mechanism (40A), and an engagement member (158A) coupled with this holding member (157A). The engagement member is rotatably supported on a housing (27B), and is configured to prohibit a movement of the holding member (157A).

According to a second configuration, in the first configuration, when the holding member (157A) is subjected to application of an excitation force, the engagement member (158A) causes a force to be applied to the holding member (157A) in a direction opposite from a direction in which the excitation force is applied.

According to a third configuration, in the first or second configuration, when the solenoid actuator (155) is driven, a center of gravity (181) of the engagement member (158A) moves in a direction opposite from a forward thrust direction of this solenoid actuator (155).

According to a fourth configuration, in any of the first to third configurations, the disk brake (1) further includes an elastic member (159) configured to bias the holding member (157A) in a direction away from the transmission mechanism (40A).

According to a fifth configuration, in any of the first to fourth configurations, when the excitation force applied to the holding member (157A) exceeds the biasing force exerted by the elastic member (159), the engagement member (158A) causes the force to be applied to the holding member (157A) in the direction opposite from the direction in which the excitation force is applied.

According to a sixth configuration, a disk brake (1) is provided. The disk brake (1) is configured to transmit a driving force from an electric motor (40) to a piston (18) via a transmission mechanism (40A), thereby thrusting forward this piston (18) and pressing a braking member (2 and 3) against a braking receiving member (D). The disk brake (1) includes a braking force holding mechanism (152A) configured to restrict a rotation of the transmission mechanism (40A) to hold a braking force based on driving of a solenoid actuator (155). The braking force holding mechanism (152A) includes a holding member (157A) configured to move based on the driving of the solenoid actuator (155) to restrict the rotation of the transmission mechanism (40A), and an engagement member (158A) coupled with this holding member (157A) and configured to prohibit a movement of the holding member (157A). The engagement member (158A) integrally includes a coupled portion (183) coupled with the holding member (157A), a support portion (184) rotatably supported on a housing (27B), and a weight portion (181). The weight portion (181) is located on an opposite side of the support portion (184) from the coupled portion (183).

According to a seventh configuration, in the sixth configuration, the holding member (157A) includes a claw portion (168) engageable with a gear (151A) provided to the transmission mechanism (40A), a plunger connection portion (169) connected to a plunger (156) provided to the solenoid actuator (155), and a curved portion (170) provided between the claw portion (168) and the plunger connection portion (169) and extending in a curved manner in a planar view. The support portion (184) of the engagement member (158A) is disposed on an inner side of the curved portion (170) of the holding member (157A).

According to an eighth embodiment, a disk brake (1) is provided. The disk brake (1) is configured to transmit a driving force from an electric motor (40) to a piston (18) via a transmission mechanism (40A), thereby thrusting forward this piston (18) and pressing a braking member (2 and 3) against a braking receiving member (D). The disk brake (1) includes a braking force holding mechanism (152A) configured to restrict a rotation of the transmission mechanism (40A) to hold a braking force based on driving of a solenoid actuator (155). The braking force holding mechanism (152A) includes a holding member (157A) configured to move based on the driving of the solenoid actuator (155) to restrict the rotation of the transmission mechanism (40A), and an engagement member (158A) coupled with this holding member (157A) and configured to prohibit a movement of the holding member (157A). The engagement member (158A) is rotatably supported on a housing (27B) between a center of gravity (181) of this engagement member (158A) and a coupled portion (183) with the holding member (157A).

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of embodiments can also be implemented with another configuration added, deleted, or replaced with respect to a part of the configuration of this embodiment.

The present application claims priority under the Paris Convention to Japanese Patent Application No. 2019-081126 filed on Apr. 22, 2019. The entire disclosure of Japanese Patent Application No. 2019-081126 filed on Apr. 22, 2019 including the specification, the claims, the drawings, and the abstract is incorporated herein by reference in its entirety.

REFERENCE SIGNS LIST 1 disk brake
2 inner brake pad (braking member)
3 outer brake pad (braking member)
18 piston
40 electric motor
40A rotational shaft (transmission mechanism)
41 multi-stage spur reduction mechanism
42 planetary gear reduction mechanism
43 rotation-linear motion conversion mechanism
150 parking brake unit
151 ratchet gear
151A gear portion 152A, 152B, 152C braking force holding mechanism
155 solenoid actuator
156 plunger
157A, 157B, 157C holding member
158A, 158B, 158C engagement member
159 compression coil spring (elastic member)
168 claw portion
169 plunger connection portion
170 curved portion
181 weight portion
183 engagement groove portion (coupled portion)
184 support hole (support portion)
D disk rotor (braking receiving member)

The invention claimed is:

1. A disk brake, the disk brake being configured to transmit a driving force from an electric motor to a piston via a transmission mechanism, thereby thrusting forward the piston and pressing a braking member against a braking receiving member, the disk brake comprising:
   a braking force holding mechanism configured to restrict a rotation of the transmission mechanism to hold a braking force based on driving of a solenoid actuator,
   wherein the braking force holding mechanism includes:
   a holding member configured to move based on the driving of the solenoid actuator to restrict the rotation of the transmission mechanism; and
   an engagement member coupled with the holding member, the engagement member being rotatably supported on a housing and configured to prohibit a movement of the holding member,
   wherein, when the holding member is subjected to application of an excitation force, the engagement member causes a force to be applied to the holding member in a direction opposite from a direction in which the excitation force is applied.

2. The disk brake according to claim 1, wherein, when the solenoid actuator is driven, a center of gravity of the engagement member moves in a direction opposite from a forward thrust direction of the solenoid actuator.

3. The disk brake according to claim 2, further comprising an elastic member configured to bias the holding member in a direction away from the transmission mechanism.

4. The disk brake according to claim 3, wherein, when an excitation force applied to the holding member exceeds the biasing force exerted by the elastic member, the engagement member causes a force to be applied to the holding member in the direction opposite from the direction in which the excitation force is applied.

5. The disk brake according to claim 1, further comprising an elastic member configured to bias the holding member in a direction away from the transmission mechanism.

6. The disk brake according to claim 5, wherein, when an excitation force applied to the holding member exceeds the biasing force exerted by the elastic member, the engagement member causes a force to be applied to the holding member in the direction opposite from the direction in which the excitation force is applied.

7. A disk brake, the disk brake being configured to transmit a driving force from an electric motor to a piston via a transmission mechanism, thereby thrusting forward the piston and pressing a braking member against a braking receiving member, the disk brake comprising:
   a braking force holding mechanism configured to restrict a rotation of the transmission mechanism to hold a braking force based on driving of a solenoid actuator,
   wherein the braking force holding mechanism includes:
   a holding member configured to move based on the driving of the solenoid actuator to restrict the rotation of the transmission mechanism; and
   an engagement member coupled with the holding member, the engagement member being configured to prohibit a movement of the holding member,
   wherein the engagement member integrally includes a coupled portion coupled with the holding member, a support portion rotatably supported on a housing, and a weight portion, and
   wherein the weight portion is located on an opposite side of the support portion from the coupled portion,
   wherein, when the holding member is subjected to application of an excitation force, the engagement member causes a force to be applied to the holding member in a direction opposite from a direction in which the excitation force is applied.

8. The disk brake according to claim 7, wherein the holding member includes
   a claw portion engageable with a gear provided to the transmission mechanism,
   a plunger connection portion connected to a plunger provided to the solenoid actuator, and
   a curved portion provided between the claw portion and the plunger connection portion, the curved portion extending in a curved manner in a planar view, and
   wherein the support portion of the engagement member is disposed on an inner side of the curved portion of the holding member.

9. A disk brake, the disk brake being configured to transmit a driving force from an electric motor to a piston via a transmission mechanism, thereby thrusting forward the piston and pressing a braking member against a braking receiving member, the disk brake comprising:
   a braking force holding mechanism configured to restrict a rotation of the transmission mechanism to hold a braking force based on driving of a solenoid actuator,
   wherein the braking force holding mechanism includes:
   a holding member configured to move based on the driving of the solenoid actuator to restrict the rotation of the transmission mechanism; and
   an engagement member coupled with the holding member, the engagement member being configured to prohibit a movement of the holding member, and
   wherein the engagement member is rotatably supported on a housing between a center of gravity of the engagement member and a coupled portion with the holding member,
   wherein, when the holding member is subjected to application of an excitation force, the engagement member causes a force to be applied to the holding member in a direction opposite from a direction in which the excitation force is applied.

* * * * *